United States Patent
O'Brien et al.

(10) Patent No.: US 7,956,281 B2
(45) Date of Patent: Jun. 7, 2011

(54) FLEXIBLE WIND DEFLECTOR FOR PHOTOVOLTAIC ARRAY PERIMETER ASSEMBLY

(75) Inventors: Colleen A. O'Brien, Oakland, CA (US); Jonathan Botkin, El Cerrito, CA (US); Andrew G. Reimers, Reno, NV (US)

(73) Assignee: SunPower Corporation, San Jose, CA (US)

( * ) Notice: Subject to any disclaimer, the term of this patent is extended or adjusted under 35 U.S.C. 154(b) by 53 days.

(21) Appl. No.: 12/269,452

(22) Filed: Nov. 12, 2008

(65) Prior Publication Data
US 2010/0116324 A1    May 13, 2010

(51) Int. Cl.
*H02N 6/00*    (2006.01)
(52) U.S. Cl. ....................................................... 136/251
(58) Field of Classification Search .................... 136/251
See application file for complete search history.

(56) References Cited

U.S. PATENT DOCUMENTS

| | | |
|---|---|---|
| 4,680,905 A | 7/1987 | Rockar |
| 4,738,247 A | 4/1988 | Moore |
| 5,316,592 A | 5/1994 | Dinwoodie |
| 5,505,788 A | 4/1996 | Dinwoodie |
| 6,000,393 A | 12/1999 | Moore |
| 6,061,978 A | 5/2000 | Dinwoodie |
| RE38,988 E | 2/2006 | Dinwoodie |
| 2003/0010374 A1 * | 1/2003 | Dinwoodie ................... 136/251 |
| 2007/0199561 A1 | 8/2007 | Soucy |
| 2009/0217964 A1 * | 9/2009 | Gilmore et al. ............... 136/244 |

OTHER PUBLICATIONS

PCT International Search Report for Application No. PCT/US2009/060879, Dec. 3, 2009, 2 sheets.

* cited by examiner

*Primary Examiner* — Jennifer K. Michener
*Assistant Examiner* — Dustin Q Dam
(74) *Attorney, Agent, or Firm* — Okamoto & Benedicto LLP

(57) ABSTRACT

A photovoltaic ("PV") array includes a plurality of interconnected PV modules. A PV array perimeter assembly may be positioned along the perimeter of the PV array to restrain horizontal movement of the array. For improved wind performance, the PV array perimeter assembly may include curbs that come with pre-attached flexible wind deflectors configured to prevent wind from penetrating underneath the PV array. The flexible wind deflectors may be made of a flexible membrane and may include water drainage holes to allow water to flow out of the PV array. The curbs do not necessarily have to be fixedly attached to a rooftop, and may include ballasts to prevent array movement. Embodiments of the invention may be employed on PV arrays installed on flat rooftops, and are especially advantageous when used on uneven roof surfaces.

18 Claims, 10 Drawing Sheets

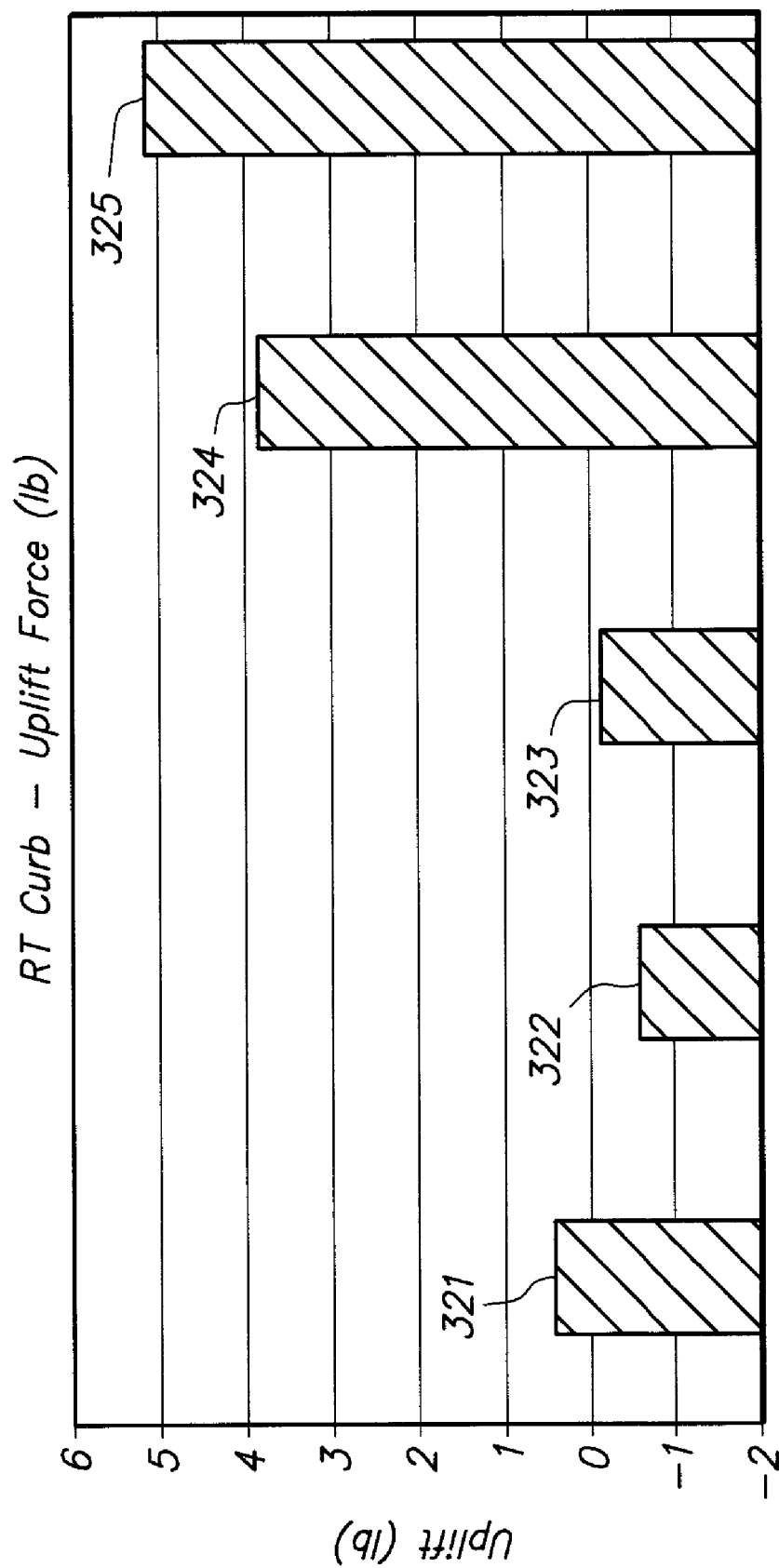

US 7,956,281 B2

FLEXIBLE WIND DEFLECTOR FOR PHOTOVOLTAIC ARRAY PERIMETER ASSEMBLY

BACKGROUND OF THE INVENTION

1. Field of the Invention

The present invention relates generally to photovoltaic cells, and more particularly but not exclusively to method and apparatus for installing photovoltaic cells.

2. Description of the Background Art

Photovoltaic cells, also referred to as "solar cells," are well known devices for converting solar radiation to electrical energy. Photovoltaic cells may be packaged together in a photovoltaic module ("PV module"), which comprises a plurality of interconnected photovoltaic cells. A photovoltaic installation may include a PV array, which includes a plurality of interconnected PV modules. The PV array may be installed on a rooftop, for example, with a surrounding perimeter assembly.

Embodiments of the present invention pertain to a PV array perimeter assembly that can withstand relatively high wind loads.

SUMMARY

In one embodiment, a photovoltaic ("PV") array includes a plurality of interconnected PV modules. A PV array perimeter assembly may be positioned along the perimeter of the PV array to restrain horizontal movement of the array. For improved wind performance, the PV array perimeter assembly may include curbs that come with pre-attached flexible wind deflectors configured to prevent wind from penetrating underneath the PV array. The flexible wind deflectors may be made of a flexible membrane and may include water drainage holes to allow water to flow out of the PV array. The curbs do not necessarily have to be fixedly attached to a rooftop, and may include ballasts to prevent array movement. Embodiments of the invention may be employed on PV arrays installed on flat rooftops, and are especially advantageous when used on uneven roof surfaces.

These and other features of the present invention will be readily apparent to persons of ordinary skill in the art upon reading the entirety of this disclosure, which includes the accompanying drawings and claims.

DESCRIPTION OF THE DRAWINGS

FIG. 10 shows results of wind tunnel testing of a photovoltaic perimeter assembly with different curb configurations.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Wind loading is a major concern with some roof-installed PV modules. In particular, wind penetrating underneath PV modules results in a pressure differential above and below the PV modules. If the wind is strong enough, the pressure differential may lift up the PV modules, detaching them from the PV array. This could result in the PV modules flying off the roof, possibly damaging other PV modules or worse, result in bodily harm or even death. The present invention pertains to a novel PV array perimeter assembly that not only holds the PV modules together in the horizontal plane, but also provides a flexible wind deflector to prevent PV modules from lifting up. The novel PV array perimeter assembly may also advantageously include provisions for water drainage and come pre-attached to a curb for ease of installation in the field.

Figure 1:
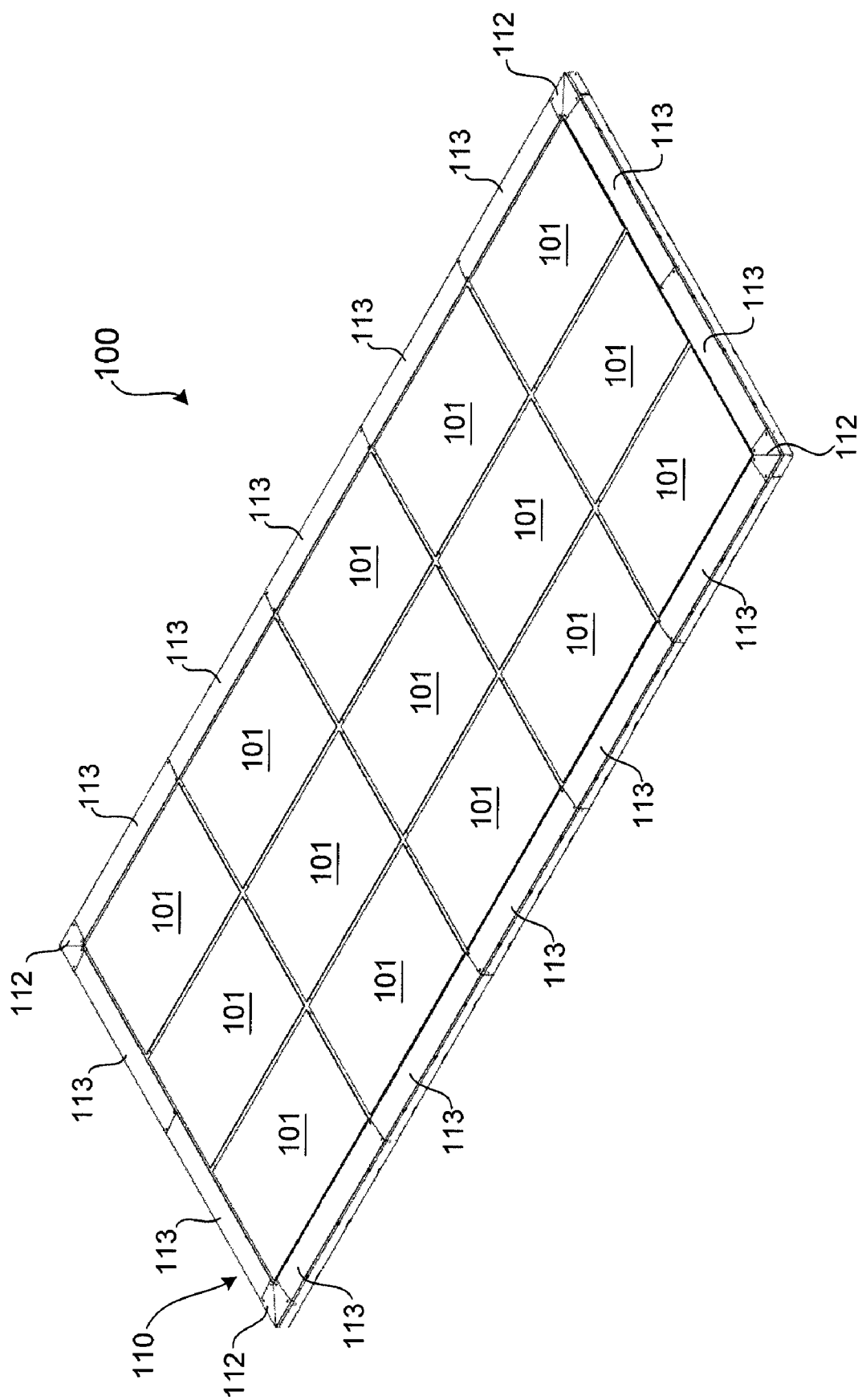
FIG. 1 shows a photovoltaic array in accordance with an embodiment of the present invention.

FIG. 1 shows a PV array 100 in accordance with an embodiment of the present invention. The PV array 100 may include a plurality of PV modules 101 surrounded by a PV array perimeter assembly 110 and installed on a rooftop. The PV array perimeter assembly 110 does not necessarily have to be fastened or fixedly attached to the rooftop. For example, the PV array perimeter assembly 110 may simply be rested on the rooftop as installed for normal operation.

Each PV module 101 may comprise a plurality of interconnected photovoltaic cells. The PV array perimeter assembly 110 restrains lateral movement of the modules 101. In the example of FIG. 1, the PV array perimeter assembly 110 comprises a plurality of curbs 113 and curb corner pieces 112. The curbs 113 provide a raised barrier around the perimeter of the modules 101, preventing the modules 101 from separating horizontally while increasing the array's wind performance. The curb corner pieces 112 connect the curbs 113 together to form a rectangular perimeter assembly. Other curb pieces with varying shapes may also be used to form other perimeter assembly configurations and shapes.

Figure 2:
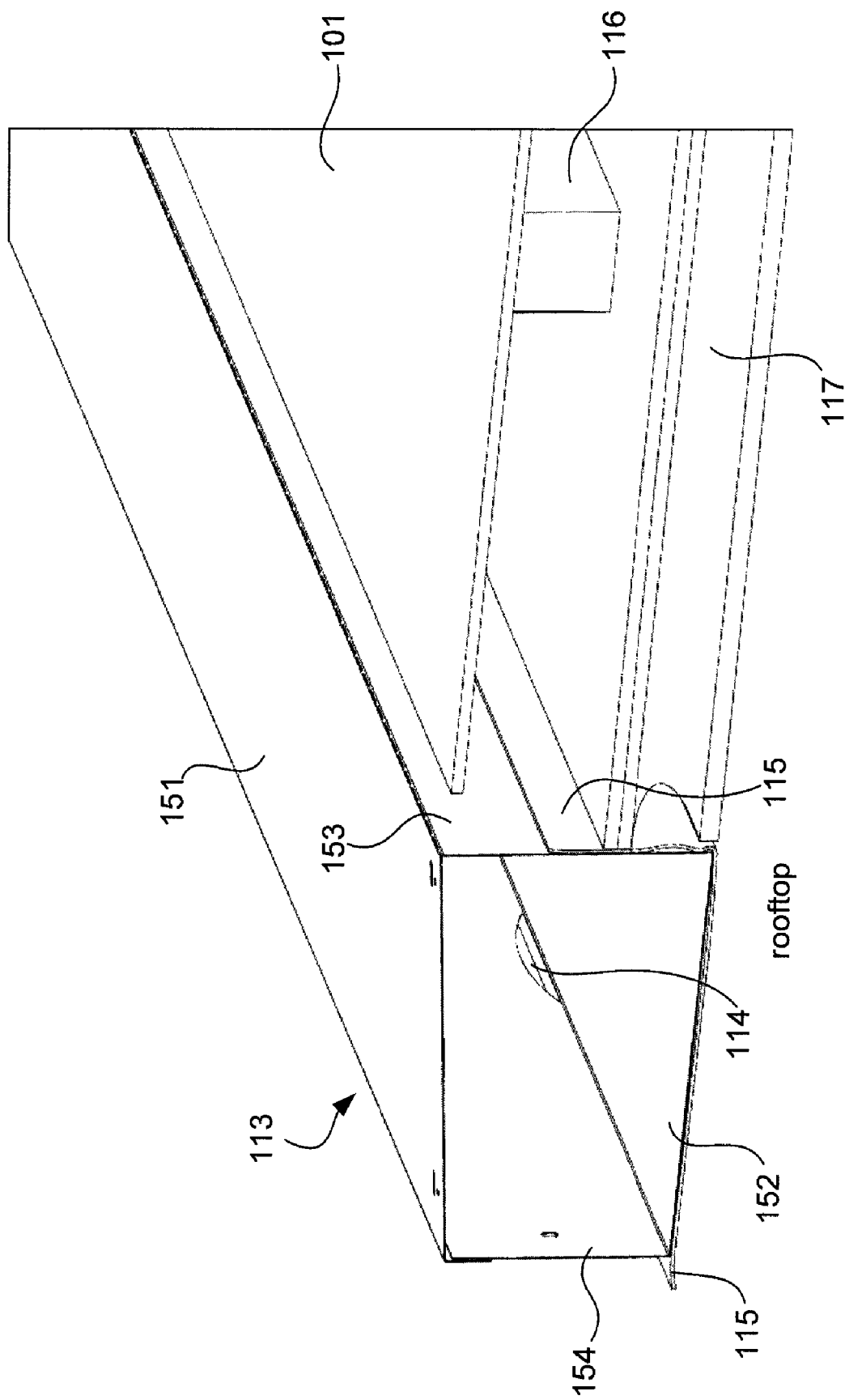
FIG. 2 shows a curb and a photovoltaic module in the photovoltaic array of FIG. 1, in accordance with an embodiment of the present invention.

FIG. 2 shows a curb 113 and a PV module 101 in the PV array 100 in accordance with an embodiment of the present invention. A curb 113 may comprise a single-piece of material (e.g. aluminum-zinc coated steel), folded into four wall portions, namely a top portion 151, a bottom portion 152, a back portion 153, and a front portion 154. As installed in the field, the top portion 151 faces towards the sky, the bottom portion 152 faces towards the rooftop, the back portion 153 faces towards the modules 101, and the front portion 154 faces away from the modules 101. In one embodiment, the top portion 151 slopes down from the top edge of the back portion 153 to the top edge of the front portion 154 at an angle of approximately 5° to 10°, for example, relative to a horizontal plane parallel to the bottom portion 152. Other curb shape configurations may also be used, including a triangular shape with a bottom, back, and outward facing diagonal slope.

Figure 4:
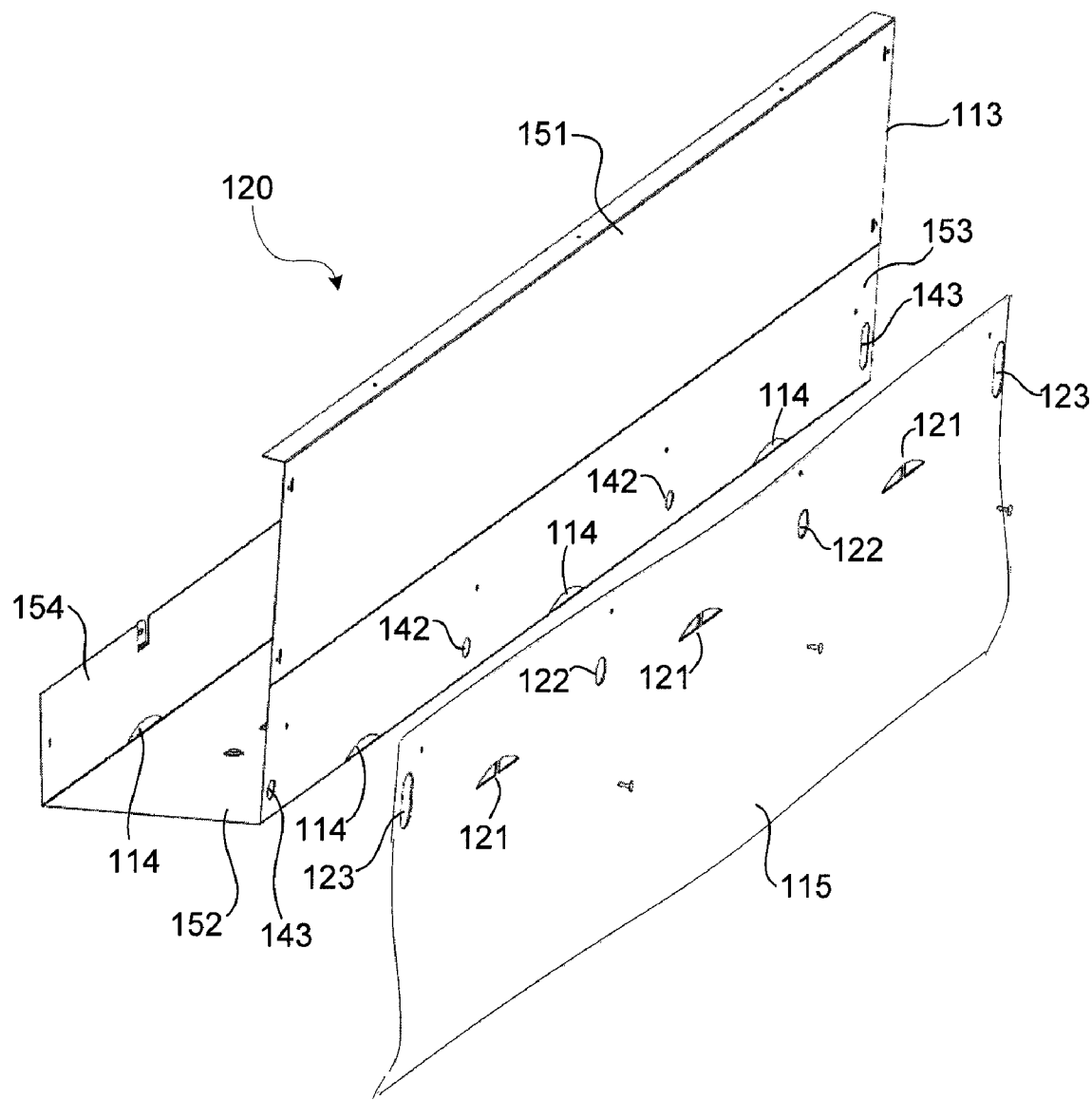
FIG. 4 is an exploded view of a curb assembly in accordance with an embodiment of the present invention.

A plurality of water drainage holes 114 on the front portion 154 are aligned in-line with corresponding plurality of water drainage holes 114 on the back portion 153 (see FIG. 4) and water drainage holes 121 on a flexible wind deflector 115 (see FIG. 4). The water drainage holes 114 and 121 advantageously allow water to drain away from the center of the array.

The flexible wind deflector 115 is so named because it may comprise a flexible membrane, such as a sheet of neoprene. In the example of FIG. 2, the wind deflector 115 is installed such that it extends past the front portion 154, lays on the rooftop and contacts the bottom portion 152, and folds to contact the back portion 153. Having the wind deflector 115 extend past the front portion 154 advantageously allows for visual inspection that the installation was properly done and that the wind deflector 115 is in the correct position.

A solar module 101 may be supported on standoffs 116, which are supported by a solar tile 117. The solar tile 117 may interlock with other solar tiles 117 supporting other solar modules 101 to hold the solar modules 101 together. The solar tiles 117 may be positioned against the back portion 153 of the curbs 113. The solar tiles 117 and standoffs 116 may comprise commercially-available PV rooftop mounting components, such as the PowerGuard® interlocking roof tiles from Sunpower Corporation of San Jose, Calif.

Figure 3:
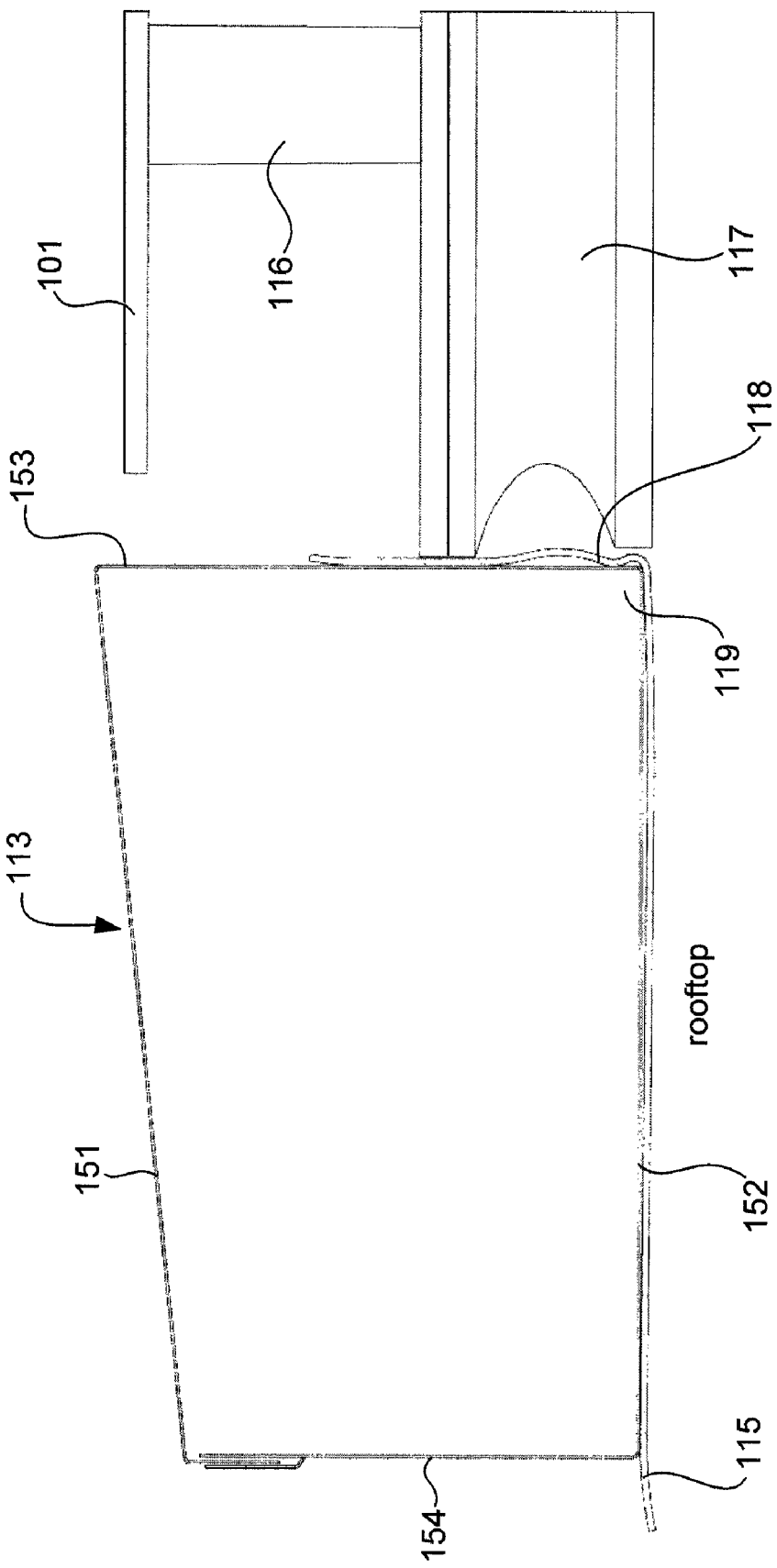
FIG. 3 shows another view of the curb and photovoltaic module of FIG. 2.

FIG. 3 shows another view of a curb 113 and a PV module 101 in the PV array 100, in accordance with another embodiment of the present invention. FIG. 3 also shows the solar tile 117 and standoff 116. As shown in FIG. 3, the flexible wind deflector 115 folds from the bottom portion 152 and over to the back portion 153 around a corner 119 of the curb 113. The flexible wind deflector 115 drapes over contours of the roof to fill in gaps between the curb 113 and the roof surface. The wind deflector 115 may bulge (see 118) on the back portion 115. When the curb 113 is rested on the rooftop, wind penetrating between the bottom portion 153 and the wind deflector 115 is blocked by the portion of the wind deflector 115 on the back portion 153. The curb 113 may be installed even on an uneven rooftop surface. The PV perimeter assembly may be rested on the rooftop without being fixedly attached to the rooftop. Ballast 131 (see FIG. 8) may be installed inside curbs 113 to stabilize the PV perimeter assembly on the rooftop.

FIG. 4 is an exploded view of a curb assembly 120 in accordance with an embodiment of the present invention. The curb assembly 120 may comprise a curb 113 and a flexible wind deflector 115. In the example of FIG. 4, the wind deflector 115 is fixedly attached to the back portion 153 by rivets, screws, or other fastening means. This allows the curb 113 and the wind deflector 115 to be shipped as a single assembly for ease of shipping, inventory, and installation. The top portion 151 may be opened to allow a ballast or other components to be placed inside the curb 113. The top portion 151 is folded closed onto the front portion 154 during normal operation. The wind deflector 115 is folded onto the back portion 152 and rested on the rooftop.

The flexible wind deflector 115 includes a plurality of water drainage holes 121 that allow water to drain through corresponding water drainage holes 114 of the curb 113. In the example of FIG. 4, the holes 123 and 122 on the wind deflector 115 are for foam screws (not shown) that attach the curb 113 to a solar tile. The foam screws go from inside the body of the curb 113 and into a foam backboard of the solar tile.

Figure 5:
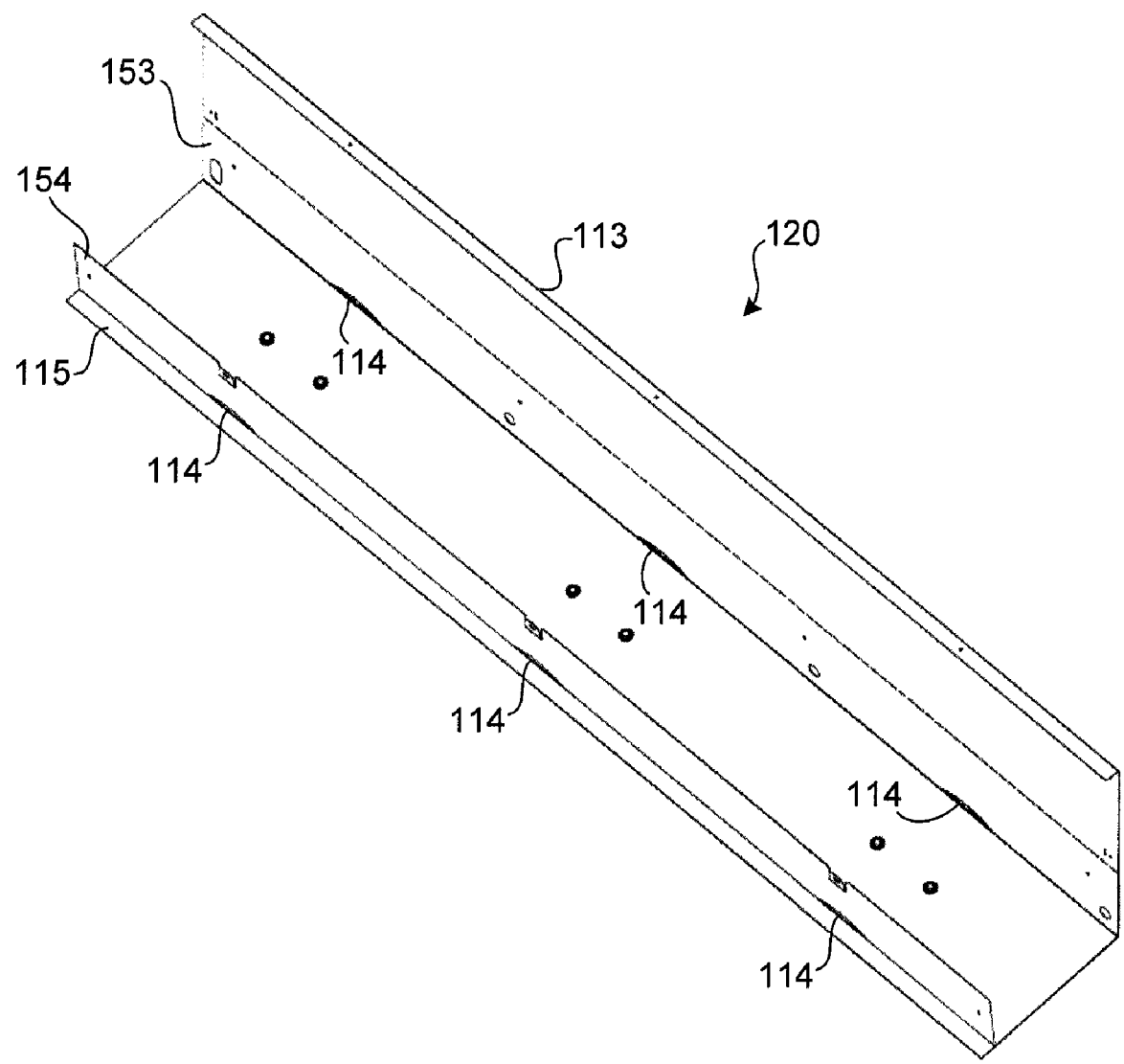
FIG. 5 is another view of the curb assembly of FIG. 4.

FIG. 5 is another view of the curb assembly 120, showing the water drainage holes 114 on the front portion 154 and the back portion 153. As discussed, the flexible wind deflector 115 includes corresponding water drainage holes 121 (see FIG. 4) to allow water to drain away from the PV array.

Figure 6:
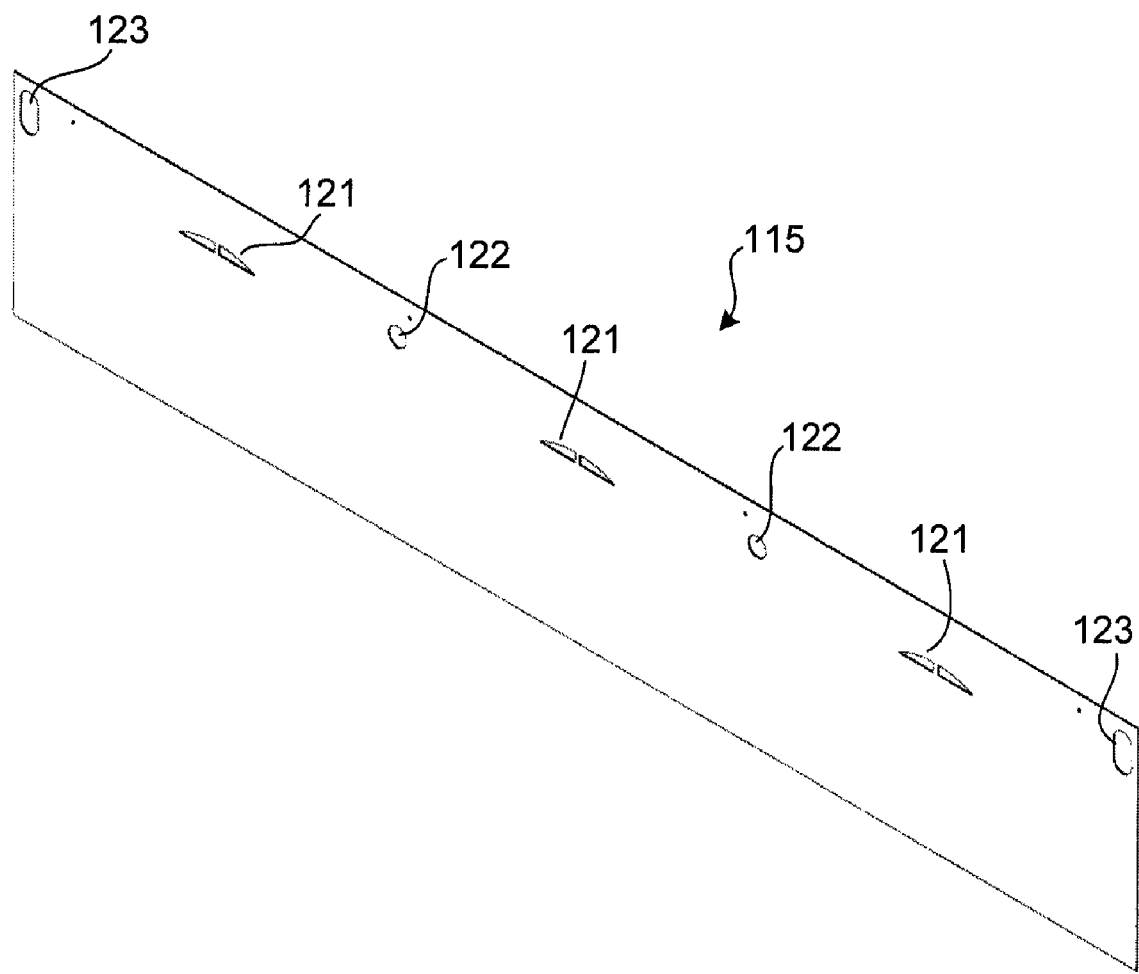
FIGS. 6 and 7 show views of a flexible wind deflector, in accordance with an embodiment of the present invention.
Figure 7:
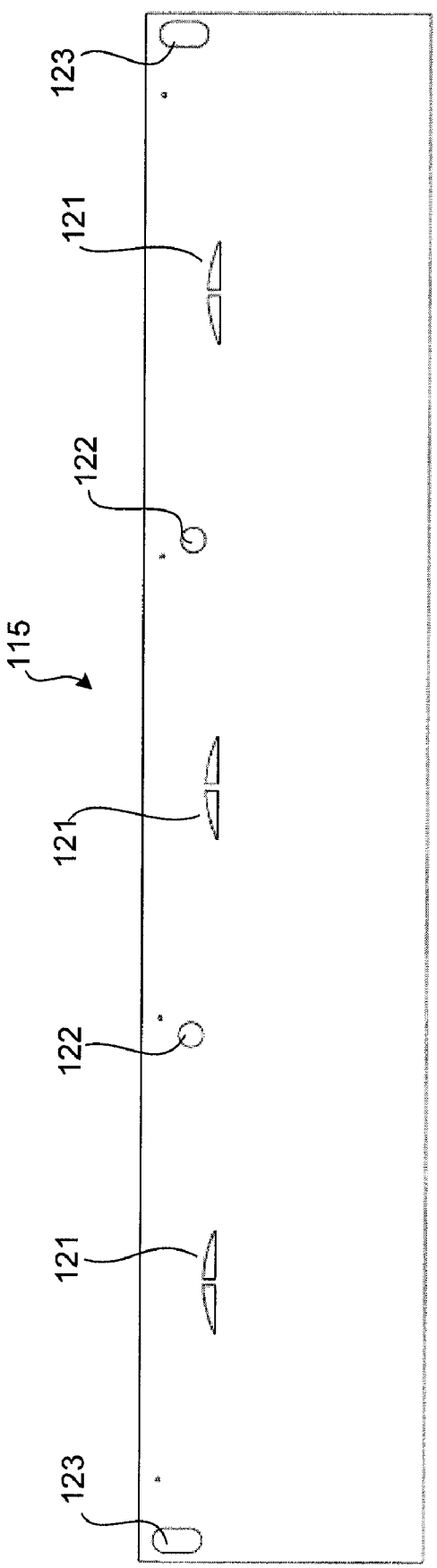

FIGS. 6 and 7 show other views of the flexible wind deflector 115, with the water drainage holes 121, and holes 122 and 123. In one embodiment, the water drainage holes 121 are shaped like quarter-ellipses for ease of manufacture, good drainage (wide cross-section lower to the ground where water will be), and low profile to prevent issues relating to wind penetrating the curb 113. The water drainage holes 121, and corresponding water drainage holes 114 on the curb 113, may have other shapes without detracting from the merits of the present invention.

Figure 8:
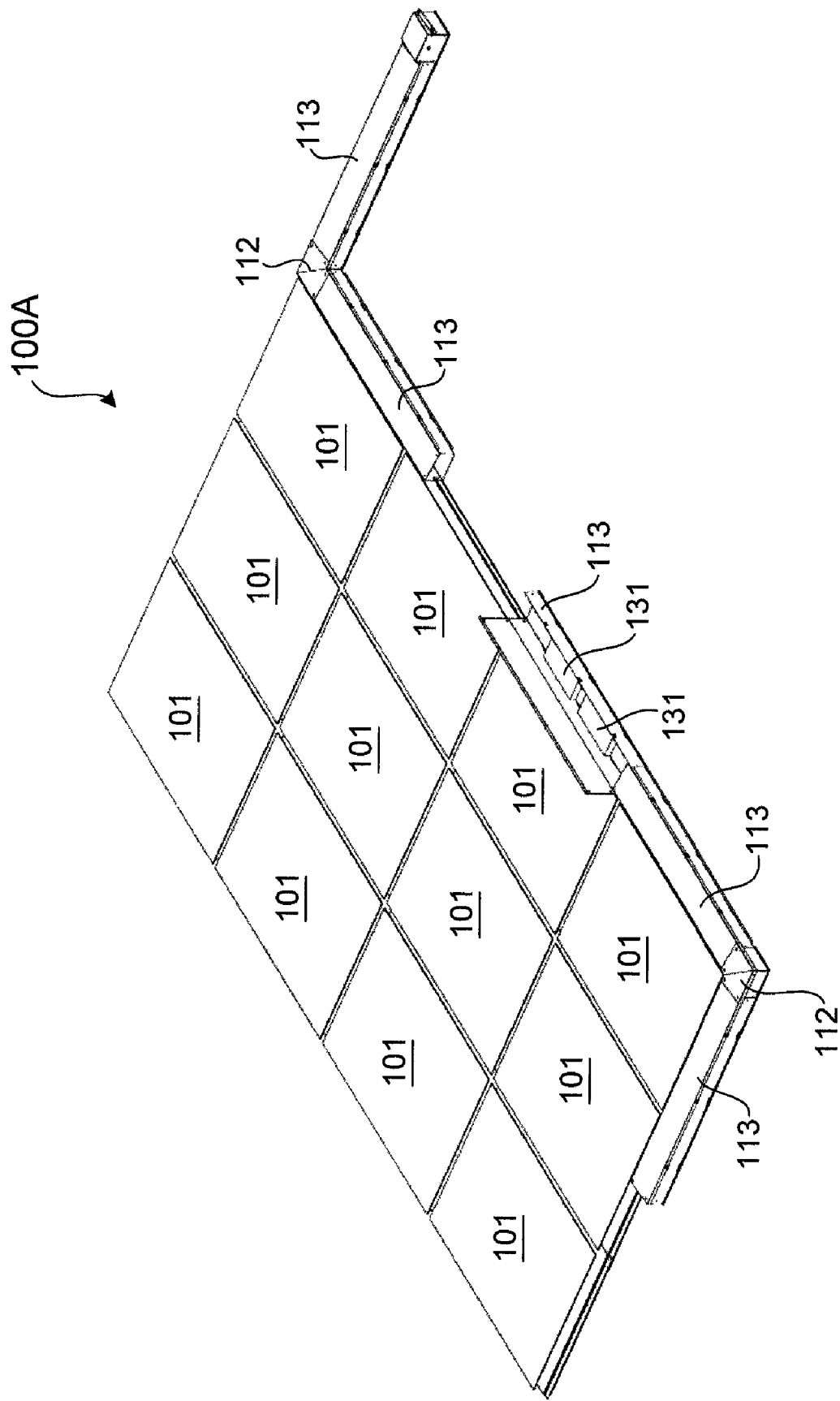
FIG. 8 shows a portion of a photovoltaic array in accordance with an embodiment of the present invention.

FIG. 8 shows a portion of a PV array 100A in accordance with an embodiment of the present invention. The PV array 100A is a particular embodiment of the PV array 100 of FIG. 1. In practice, the curbs 113 would surround the perimeter of the modules 101, but is not so drawn in FIG. 8 to indicate that the PV array 100A is not necessarily rectangular and may extend beyond what is shown in FIG. 8. For example, additional modules 101, curbs 113, and curb corner pieces 112 may be added to the PV array 100A as depicted.

Figure 9:
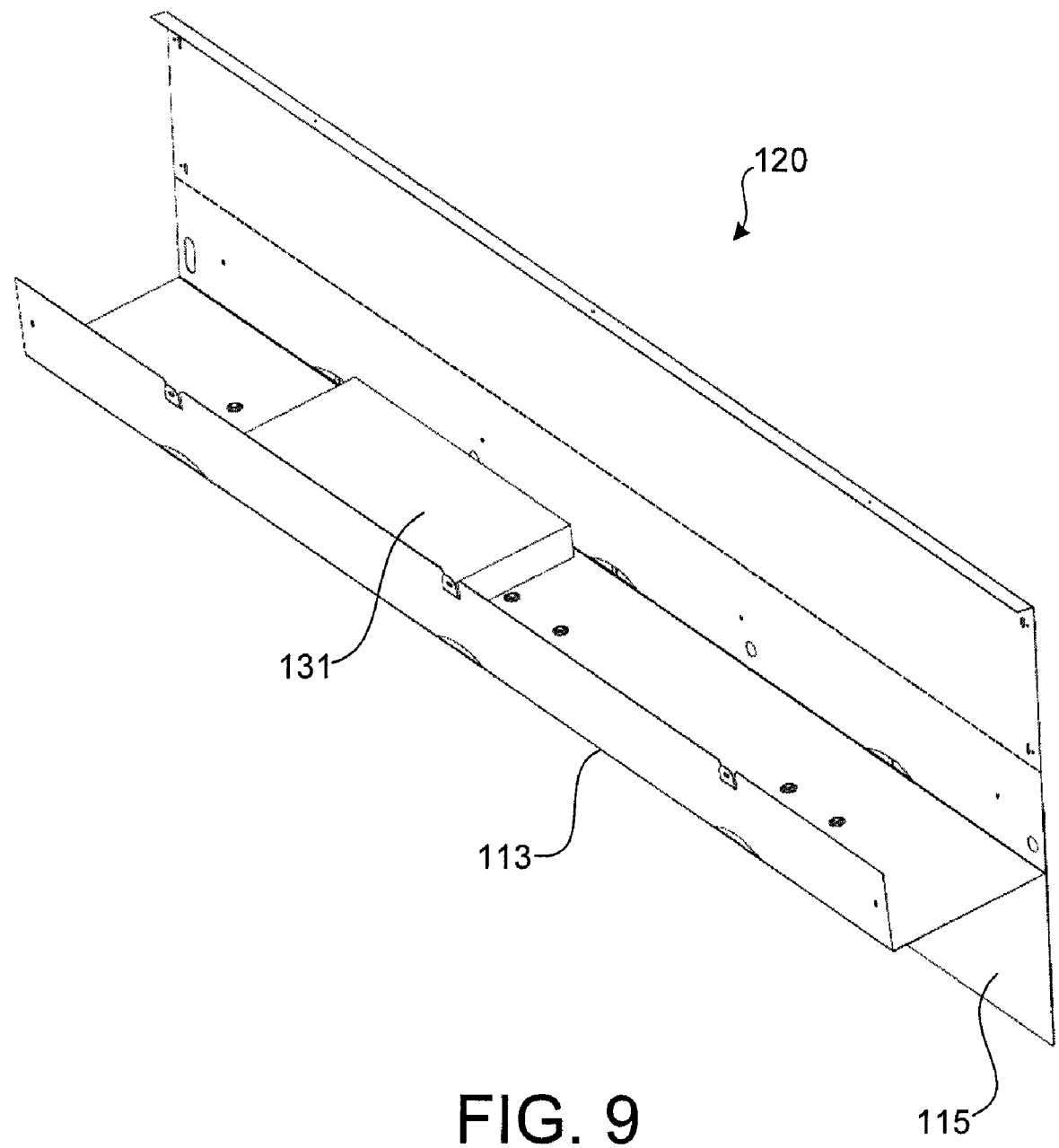
FIG. 9 shows a ballast positioned inside a curb of the curb assembly of FIG. 8, in accordance with an embodiment of the present invention.

In the example of FIG. 8, the curbs 113 may include ballasts 131. The ballasts 131 stabilize the PV perimeter assembly and may comprise a heavy material, such as concrete/cinder block pavers. FIG. 9 shows a ballast 131 positioned inside a curb 113 of the curb assembly 120, which comprises the curb 113 and a flexible wind deflector 115.

FIG. 10 shows results of wind tunnel testing of a PV perimeter assembly with different curb configurations. The wind tunnel tests were conducted on full scale curbs rested (without being fixedly affixed) on a roof surface that is made of plywood and treated with a varnish surface to obtain the proper friction coefficient between the solar tiles supporting the PV modules and the roof surface. Although a roof surface may appear perfectly flat, imperfections in the plywood surface create gaps under the curb.

The bar graphs 321 and 322 are for first and second trial runs, respectively, involving wind tunnel testing of a full scale curb that is taped onto the roof to create a perimeter seal without gaps under the curb. The resulting uplift force for the first trial run is 0.42 lb, while the resulting uplift force for the second trial run is −0.55 lb. These uplift forces were considered performance targets for a curb with gaps between the curb and the roof surface.

The bar graph 323 is for a third trial run involving wind tunnel testing of a full scale curb with a flexible wind deflector (e.g., flexible wind deflector 115) underneath, with gaps underneath the curb. The uplift force for the third trial run is −0.13 lb, which falls within the target wind performance level.

The bar graphs 324 and 325 are for fourth and fifth trial runs, respectively, involving wind tunnel testing of a full scale curb with gaps underneath the curb but without additional features, i.e., not taped onto the roof, without flexible wind deflector. The resulting uplift forces are 3.87 lb in the fourth trial run and 5.15 lb in the fifth trial run, which do not meet the target wind performance level.

The results of the wind tunnel testing indicate that a curb with a flexible wind deflector provides improved wind performance level when placed over an uneven surface. This together with ease of installation and shipping make the use of the flexible wind deflector advantageous in PV perimeter assemblies.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A photovoltaic perimeter assembly for a photovoltaic array, the photovoltaic perimeter assembly comprising:

a plurality of curbs surrounding a perimeter edge of a plurality of photovoltaic modules, at least a curb in the plurality of curbs including a plurality of water drainage holes; and a flexible wind deflector extending beyond an outer most portion of the curb and folded from a bottom portion of the curb onto a back portion of the curb such that the flexible wind deflector drapes over contours of a roof to fill in gaps between the curb and the roofs surface, the flexible wind deflector comprising a flexible membrane comprising a rubber-like material and a plurality of water drainage holes therethrough aligned in-line with the water drainage holes of the curb.

2. The photovoltaic perimeter assembly of claim 1 wherein the photovoltaic perimeter assembly is installed on a rooftop and the flexible wind deflector is located between the bottom portion of the curb and the roofs surface.

3. The photovoltaic perimeter assembly of claim 1 wherein the flexible wind deflector comes fixedly pre-attached to the back portion of the curb.

4. The photovoltaic perimeter assembly of claim 1 wherein the curb includes a ballast configured to stabilize the curb on the roof.

5. The photovoltaic perimeter assembly of claim 1 wherein the flexible membrane comprises neoprene.

6. The photovoltaic perimeter assembly of claim 1 wherein a top portion of the curb slopes downward from an edge of the back portion of the curb.

7. The photovoltaic perimeter assembly of claim 1 wherein the plurality of curbs is not fixedly attached to the roof as installed for normal operation.

8. A photovoltaic array comprising:

a plurality of photovoltaic modules, each of the photovoltaic modules comprising a plurality of photovoltaic cells;

a photovoltaic perimeter assembly surrounding the photovoltaic modules; and a flexible membrane comprising a rubber-like material under the photovoltaic perimeter assembly, the flexible membrane draping over contours of a roof to fill in gaps between the photovoltaic perimeter assembly and the roof's surface and being configured to deflect wind under the photovoltaic perimeter assembly, the flexible membrane extending beyond an outer most portion of the photovoltaic perimeter assembly and being folded from under the photovoltaic perimeter assembly onto a back portion facing towards the photovoltaic modules.

9. The photovoltaic array of claim 8 wherein the photovoltaic module is not fixedly attached to the roof as installed for normal operation.

10. The photovoltaic array of claim 8 wherein the photovoltaic perimeter assembly includes a ballast configured to stabilize the photovoltaic perimeter assembly on the roof.

11. The photovoltaic array of claim 8 wherein the flexible membrane comprises a plurality of water drainage holes configured to allow water to drain out of the photovoltaic perimeter assembly.

12. The photovoltaic array of claim 8 wherein the photovoltaic perimeter assembly includes a plurality of curbs configured to surround a perimeter of the photovoltaic modules.

13. The photovoltaic array of claim 12 wherein the flexible membrane comes fixedly pre-attached to a curb in the plurality of curbs.

14. The photovoltaic array of claim 12 wherein a top portion of the curb slopes downward from an edge of a back portion of the curb.

15. A photovoltaic perimeter assembly for framing a photovoltaic module, the photovoltaic perimeter assembly comprising:

a flexible membrane comprising a rubber-like material under the frame such that the flexible membrane drapes over contours of a roof to fill in gaps between the frame and the roof's surface and configured to deflect wind under the frame, the flexible membrane extends beyond an outer most portion of the frame and being folded from under the frame onto a back portion of the frame that faces photovoltaic modules surrounded by the frame.

16. The photovoltaic perimeter assembly of claim 15 wherein the flexible membrane comes fixedly pre-attached to the frame.

17. The photovoltaic perimeter assembly of claim 15 wherein the frame surrounds the photovoltaic modules with curbs positioned along a perimeter of the photovoltaic modules.

18. The photovoltaic perimeter assembly of claim 15 wherein the frame is not fixedly attached to a roof on which the photovoltaic perimeter assembly is installed and the photovoltaic perimeter assembly includes ballasts configured to stabilize the photovoltaic perimeter assembly on the roof.

* * * * *